H. F. RIEKENBERG.
HAY SLING.
APPLICATION FILED AUG. 21, 1916.
1,207,795.
Patented Dec. 12, 1916.
2 SHEETS—SHEET 1.
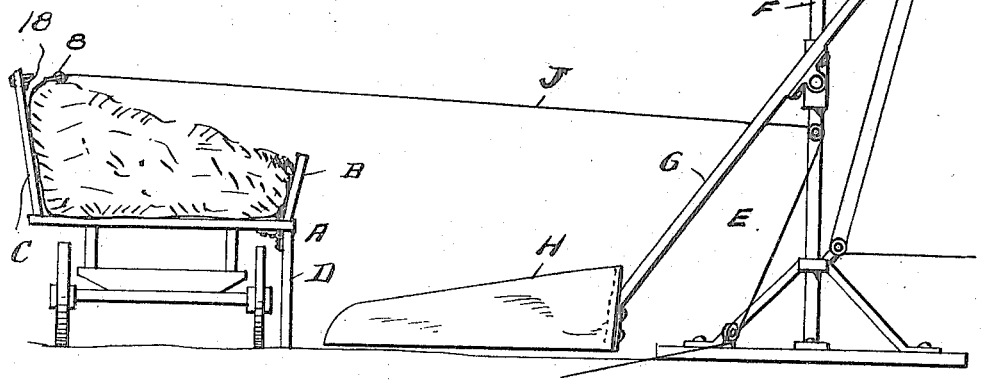
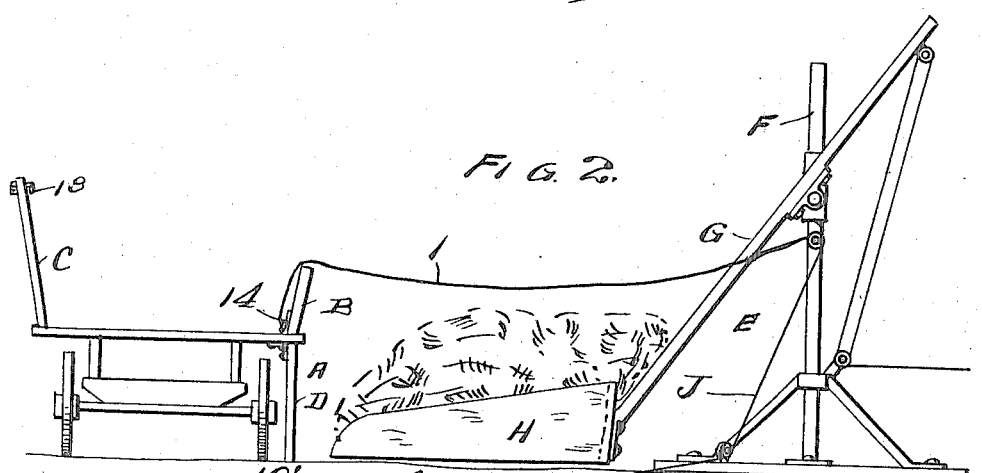
INVENTOR
H. F. RIEKENBERG.
Herman A. Phillips
Attorney.

H. F. RIEKENBERG.
HAY SLING.
APPLICATION FILED AUG. 21, 1916.
1,207,795.
Patented Dec. 12, 1916.
2 SHEETS—SHEET 2.
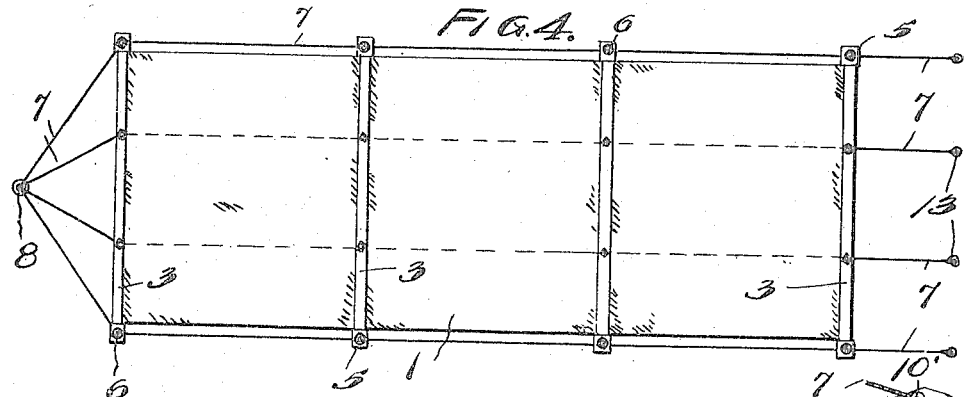
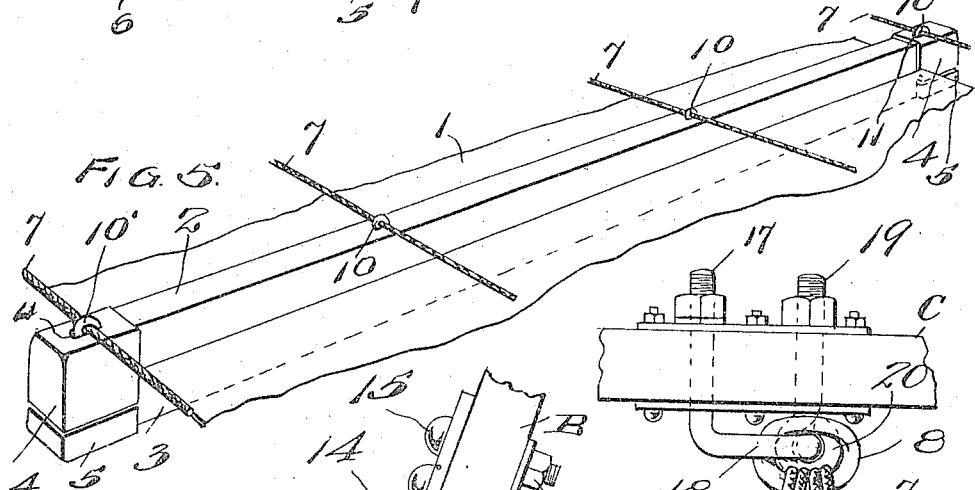
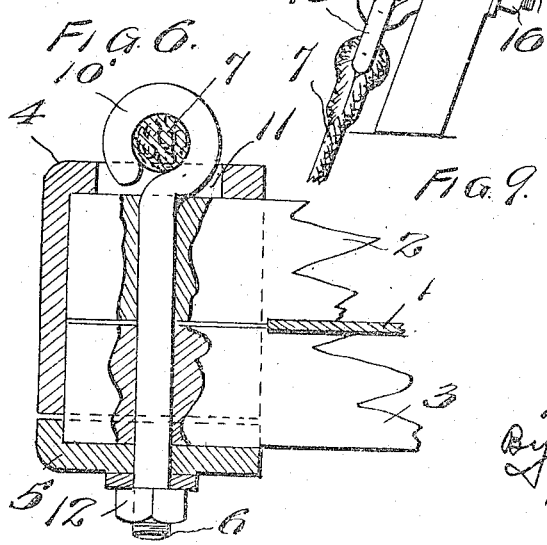
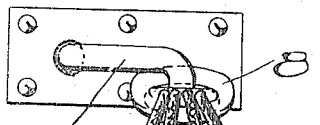
INVENTOR
H. F. RIEKENBERG
By Herman R. Phillips
Attorney

UNITED STATES PATENT OFFICE.

HENRY F. RIEKENBERG, OF SYLVAN GROVE, KANSAS.

HAY-SLING.

1,207,795.

Specification of Letters Patent.

Patented Dec. 12, 1916.

Application filed August 21, 1916. Serial No. 116,031.

*To all whom it may concern:*

Be it known that I, HENRY F. RIEKENBERG, a citizen of the United States of America, residing at Sylvan Grove, in the county of Lincoln and State of Kansas, have invented new and useful Improvements in Hay-Slings, of which the following is a specification.

My invention relates to an improved hay sling designed for use in connection with hay loaders or stackers, and adapted to be utilized in connection with a hay wagon or header box.

The primary object of the invention is to provide a device of this character which is comparatively simple in construction, and in its use, but which is perfect in performing the functions for which it is intended.

The invention consists in certain novel combinations and arrangements of parts in the sling and in its application to the header box, as will be more fully hereinafter described and claimed.

In the accompanying drawings I have illustrated one complete example of the physical embodiment of my invention constructed according to the best mode I have so far devised for the practical application of the principles of the invention.

Figure 1 is a view illustrating the sling with a load of hay in a header box of a wagon and illustrating the stacker which is used in connection with the sling in position for unloading the load from the wagon. Fig. 2 is a similar view showing the apparatus after the load has been lifted from the wagon. Fig. 3 is a bottom plan view of the sling, detached. Fig. 4 is a top plan view of the sling. Fig. 5 is an enlarged, fragmentary view of the sling illustrating one of the transverse bars and its relation to the canvas and ropes of the sling. Fig. 6 is an enlarged, partly sectional detail view of means for clamping the transverse bars and certain of the rope braces. Fig. 7 is a view showing the top edges of the upper side rail of the header box and illustrating the attachment of the sling thereto. Fig. 8 is a view in elevation of the device of Fig. 7. Fig. 9 is an edge view showing the top of the lower side rail and the manner of attaching the lower end of the sling to this rail in the header box.

In the accompanying drawings, in order to clearly exemplify the use of my invention, I have illustrated in connection therewith the wagon A, which is provided with a header box comprising the side rail B, and the higher or upper side rail C. The wagon is provided with a hinged brace or prop D to prevent wagon from upsetting and guard against driving on to the fork of the stacker, and the load is designed to be lifted therefrom by means of the stacker E. This stacker may be of any standard or usual type, and comprises the mast F, the derrick arm G, and the fork or cradle H, the latter being adapted to receive the load of hay, headed grain, or straw from the sling.

The sling of my invention comprises a flexible body member as 1, which may be of canvas, and this member is provided with a suitable number of transverse bars which are made up of sections as 2 and 3. The bars are of duplicate form, and of the proper dimensions, and are joined together at their respective ends by metallic caps which are made up of sectional members 4 and 5. These two members provide a cap to fit over the ends of the parallel bars 2 and 3, and they are clamped together by means of the bolts 6 which are passed through the perforated ends of the bars 2 and 3, and also through the members of the caps. I have illustrated four cords or ropes 7 to support the sling, and these ropes extend throughout the length of the sling, and beyond the ends thereof. At the upper end of the sling when it is in loaded position in the header box, a ring 8 is provided to which the ends of the four ropes are attached. These ropes are located at the underside of the sling, and they pass through eyebolts 10 which are fixed in the transverse bar 2, and it will be observed that the bolts 6 at the ends of the transverse bars have eyes 10' through which the outside ropes 7 pass. By means of these eye bolts 6 the outside ropes 7 are clamped and held tight. In order that the parts may be clamped together, a slot 11 is provided in the lower end of the cap section 4 so that the eye 10' may be drawn into the section. Thus, when the nut 12 on the bolt 6 is turned, the rope 7 is pulled within the slot, and clamped between the eye 10' and the surface of the cap section 4.

In Fig. 6, it will be seen that the two bar sections 2 and 3 are also clamped together, and the canvas 1 is clamped between them, by this action of the clamping nut 12. The bolts 6 at the ends of the transverse bars are the only bolts which are used to clamp the parts, and it will be seen that this is sufficient to form a rigid connection between the transverse bars and the canvas, and in this manner a well supported and braced sling is provided.

The ends of the ropes 7, opposite the ring 8, are each provided with a ring 13, and these rings are each permanently attached to a hook 14 which is attached as by bolts 15 and nuts 16 to the lower side rail B of the header box.

The other end of the sling with the converging rope ends 7 and the single ring 8 holding them, is supported from the upper side rail C of the header box. For this purpose I provide a bolt 17 which is rotatable in the side rail C of the header box and provided with an angular bent hook 18. In conjunction with this hook I arrange a second bolt 19 in the side rail C, which is provided with an eye 20 to form the keeper for the hook 18. In Figs 7 and 8, the manner of attaching the ring to the side rail C will be apparent. The ring 8 is placed over the eye 20 of bolt 19, and then the hook 18 is turned down so that its end will pass through both the ring 8 and the eye bolt 20, and in this manner the sling is suspended or hung from the side rail C.

With the sling supported in proper position in the header box, and attached at its ends as described, the load of hay, headed grain, or straw is placed therein. In actual use it is desirable to employ two or more slings throughout the length of the wagon body, or header box and divided by a partition. After the wagon has been properly loaded, it is hauled to position, adjacent the stacker as shown in Fig. 1. The hook 18 is now lifted from its keeper 20 and the ring 8, and the rope J on the stacker is attached to the ring 8. Proper power is applied to pull the rope, and the load of hay, headed grain, or straw is bodily lifted and turned out of the header box and emptied from the sling to position shown in Fig. 2. When the cradle or fork H is loaded, it can be operated as usual to stack the hay. The sling is replaced in its proper position, and is then ready for another load. The attachment 13—14 at the lower end of the sling is permanent, but the sling is detachably supported at its other end from the upper side rail C.

From the above description taken in connection with my drawings it is apparent that I have provided a device which fulfils the purposes and functions of a comparatively perfect sling, and also accomplishes the objects set forth as the purpose of my invention.

What I claim is:

1. The combination in a hay sling with its canvas member and parallel transverse bars, of sectional caps on each pair of bars, one of said caps having a slot therein, the other one perforated, a bolt passed through said perforated cap member and the ends of the bars, an eye on said bolt and a supporting rope passed through said eye, and a nut on the bolt for clamping these parts together.

2. The combination with a header box including its side rails, of a hay sling having spaced supporting ropes projecting beyond one end and separately attached to the lower side rail, the other ends of said ropes having an attaching ring, an eye bolt secured in the upper side of the other side rail, and a locking hook adapted to engage said ring and eye bolt.

3. A hay sling comprising a canvas strip and upper and lower parallel transverse bars, sectional caps at the ends of said bars, eye bolts passed through said caps and bars, supporting ropes passed through said eye bolts, and nuts on the bolts for clamping the caps to rigidly hold the ropes in said eye bolts.

In testimony whereof I affix my signature.

HENRY F. RIEKENBERG.

Copies of this patent may be obtained for five cents each, by addressing the "Commissioner of Patents, Washington, D. C."